US008625171B2

(12) United States Patent
Ono

(10) Patent No.: US 8,625,171 B2
(45) Date of Patent: Jan. 7, 2014

(54) IMAGE FORMING APPARATUS

(75) Inventor: Yasuhiro Ono, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 252 days.

(21) Appl. No.: 13/285,066

(22) Filed: Oct. 31, 2011

(65) Prior Publication Data

US 2012/0120459 A1 May 17, 2012

(30) Foreign Application Priority Data

Nov. 15, 2010 (JP) ................................. 2010-254391

(51) Int. Cl.
*H04N 1/04* (2006.01)
*H04N 1/23* (2006.01)

(52) U.S. Cl.
USPC .......................................... 358/474; 358/300

(58) Field of Classification Search
USPC .................................................. 358/474, 300
See application file for complete search history.

(56) References Cited

U.S. PATENT DOCUMENTS 5,062,003 A * 10/1991 Kawabata ..................... 358/300

FOREIGN PATENT DOCUMENTS

| | | |
|---|---|---|
| JP | 06-305185 | 11/1994 |
| JP | 11-231244 | 8/1999 |
| JP | 2005-192076 | 7/2005 |

* cited by examiner

*Primary Examiner* — Charlotte M Baker
*Assistant Examiner* — Rury Grisham
(74) *Attorney, Agent, or Firm* — Renner, Otto, Boiselle & Sklar, LLP

(57) ABSTRACT

A cover member holds an optical scanning device and is supported on A main body in such a manner as to be pivotable between an open position and a closed position. The optical scanning device has a shutter member, a housing, and a dustproof member. The main body has a contact member which is capable of coming into contact with the shutter member through an opening. The contact member causes the shutter member to be displaced between an optical path closing position and an optical path opening position. The shutter member includes a closing portion which closes the opening when the shutter member assumes the optical path closing position. The dustproof member is disposed to extend around the opening on the outside and is configured to press against an entire periphery of the contact member when the cover member assumes the closed position.

8 Claims, 11 Drawing Sheets

IMAGE FORMING APPARATUS

CROSS REFERENCE

This Nonprovisional application claims priority under 35 U.S.C.§119(a) on patent application Ser. No. 2010-254391 filed in Japan on Nov. 15, 2010, the entire contents of which are hereby incorporated by reference.

BACKGROUND OF THE INVENTION

The present invention relates to an image forming apparatus including a main body and a cover member which are pivotally supported on each other at their one end for pivotal movement relative to each other, and an optical scanning device held by the cover member.

An electrophotographic image forming apparatus includes an optical scanning device and an image forming section. Laser light emitted from the optical scanning device is applied onto an electrostatic latent image bearing member incorporated in the image forming section and the resulting electrostatic latent image is subjected to an electrophotographic process for forming an image on a recording sheet.

Preferably, such an image forming apparatus is easily openable to expose the interior thereof so that the image forming section and like sections can be subjected to maintenance. On the other hand, the image forming apparatus has to prevent laser light from leaking out during the maintenance because the laser light is narrowed down to form a very small spot and hence has high energy.

In attempt to satisfy such requirements, a known image forming apparatus, as described in Japanese Patent Laid-Open Publication No. HEI6-305185 for example, includes a main body and a cover member which are coupled to each other at their one end for pivotal movement relative to each other, and a shutter member disposed on the optical path of laser light so as to be movable up and down, wherein when the cover member is closed, a projection presses up the shutter member to open the optical path, whereas when the cover member is opened, the projection retracts to cause the shutter member to move down by its own weight thereby to close the optical path.

With the image forming apparatus described in Japanese Patent Laid-Open Publication No. HEI6-305185, however, the projection provided on the main body passes through a through-hole provided in the cover member along an arcuate locus as the main body and the cover member pivot relative to each other about their one end and, therefore, the projection and the through-hole have to define a clearance therebetween. For this reason, the clearance defined between the projection and the through-hole may allow dust to pass therethrough and enter the inside of the optical scanning device.

Accordingly, a feature of the present invention is to provide an image forming apparatus capable of preventing dust from entering the inside of an optical scanning device provided with a shutter member which is displaceable between an optical path closing position and an optical path opening position.

SUMMARY OF THE INVENTION

An image forming apparatus according to the present invention includes a main body and a cover member. The cover member holds an optical scanning device and is supported on the main body in such a manner as to be pivotable between a predetermined open position and a predetermined closed position. The optical scanning device has a light source for emitting laser light, a shutter member which is displaceable between an optical path closing position for closing an optical path of the laser light and an optical path opening position for opening the optical path, a housing accommodating the light source and the shutter member therein and having an opening at a bottom surface facing the main body, and a dustproof member having elasticity. The main body has a contact member which is capable of coming into contact with the shutter member through the opening and which becomes positioned away from the shutter member to cause the shutter member to assume the optical path closing position when the cover member assumes the open position while coming into contact with the shutter member to cause the shutter member to assume the optical path opening position when the cover member assumes the closed position. The shutter member includes a closing portion which closes the opening from inside the housing when the shutter member assumes the optical path closing position. The dustproof member is disposed on an outer side of the housing in such a manner as to extend around the opening and is configured to press against an entire periphery of the contact member when the cover member assumes the closed position.

With this arrangement, when the image forming apparatus is in normal operation, namely, when the cover member assumes the closed position, the contact member comes into contact with the shutter member to cause the shutter member to assume the optical path opening position, so that an image forming process is ready to be carried out. By the dustproof member pressing against the entire periphery of the contact member, the opening is closed from outside the housing. On the other hand, when the image forming apparatus is subjected to maintenance, namely, when the cover member assumes the open position, the contact member is positioned away from the shutter member to cause the shutter member to assume the optical path closing position. Accordingly, laser light, even when emitted from the light source by malfunction or the like, is blocked within the housing of the optical scanning device and hence can be prevented from leaking out of the housing. In addition, the shutter member closes the opening from inside the optical scanning device. Thus, the opening is closed during both of the normal operation and the maintenance.

According to the present invention, it is possible to prevent dust from entering the inside of the optical scanning device provided with the shutter member which is displaceable between the optical path closing position and the optical path opening position.

DETAILED DESCRIPTION OF THE INVENTION

Hereinafter, embodiments of the present invention will be described with reference to the attached drawings.

Figure 1A:
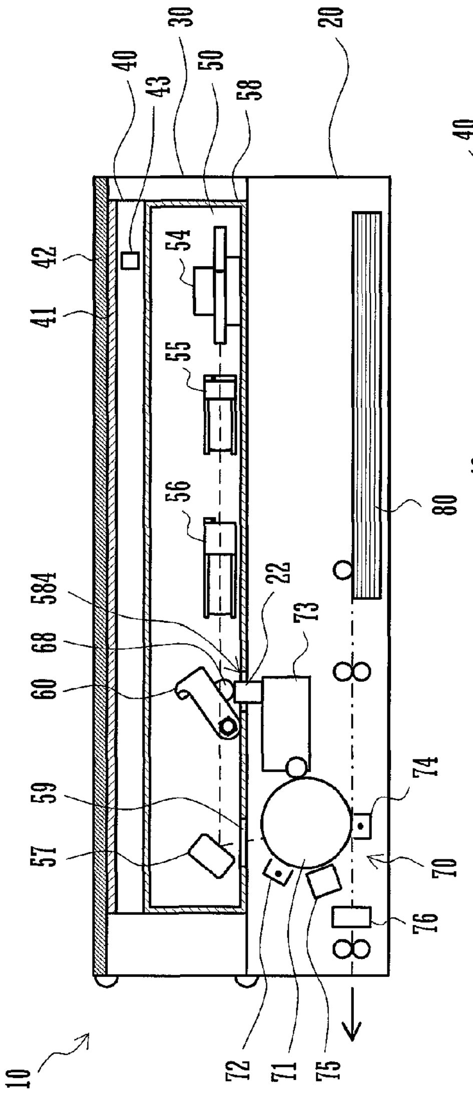
FIG. 1A is a sectional side elevational view schematically illustrating the structure of an image forming apparatus in a closed condition according to an embodiment of the present invention.
Figure 1B:
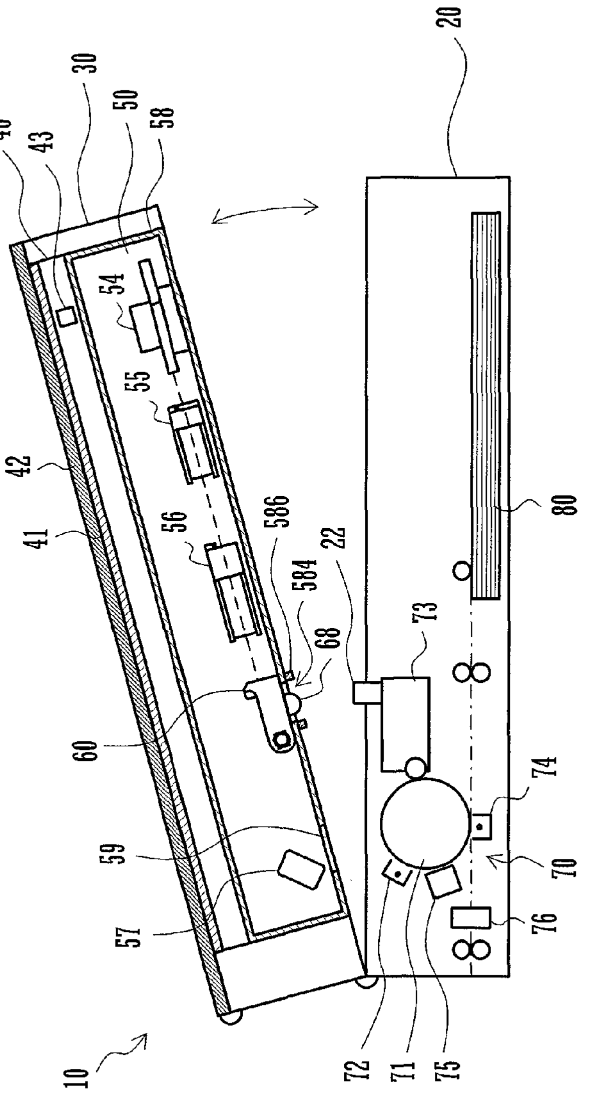
FIG. 1B is a sectional side elevational view schematically illustrating the structure of the image forming apparatus in an open condition according to the embodiment of the present invention.

Referring to FIGS. 1A and 1B, an image forming apparatus 10 includes a main body 20 and a cover member 30. One end portion of the cover member 30 is pivotally supported on one end portion of the main body 20 in such a manner that the cover member 30 can pivot relative to the main body 20 within a predetermined range. Thus, when the image forming apparatus 10 is placed with the main body 20 positioned below the cover member 30, the cover member 30 can pivot relative to the main body 20 to assume a closed position shown in FIG. 1A and an open position shown in FIG. 1B. During image formation, the image forming apparatus 10 is in a closed condition in which the cover member 30 is in the closed position. During maintenance for replacement of a developing unit 73 to be described later, for replacement of a photoreceptor unit including a photoreceptor drum 71 to be described later, or for other maintenance operations, on the other hand, the image forming apparatus 10 is in an open condition in which the cover member 30 is in the open position.

The cover member 30 holds therein a scanner unit 40 and an optical scanning device 50.

The scanner unit 40 is placed in an upper portion of the cover member 30. The scanner unit 40 includes a document platen 41, a document platen cover 42, and a CIS (contact image sensor) 43. The CIS 43, which is an example of an image reading section, may be replaced with a scanning unit incorporating a CCD (charge coupled device) sensor and optical components.

The document platen cover 42 can pivot about an axis extending along an end portion on the same side as the end portion about which the main body 20 and the cover member 30 are pivotally supported relative to each other, thereby opening and closing the top surface of the document platen 41. The CIS 43 is located below the document platen 41 and reads an image from a document placed on the document platen 41 to generate image data by moving along the document platen 41 in a secondary scanning direction.

Figure 2:
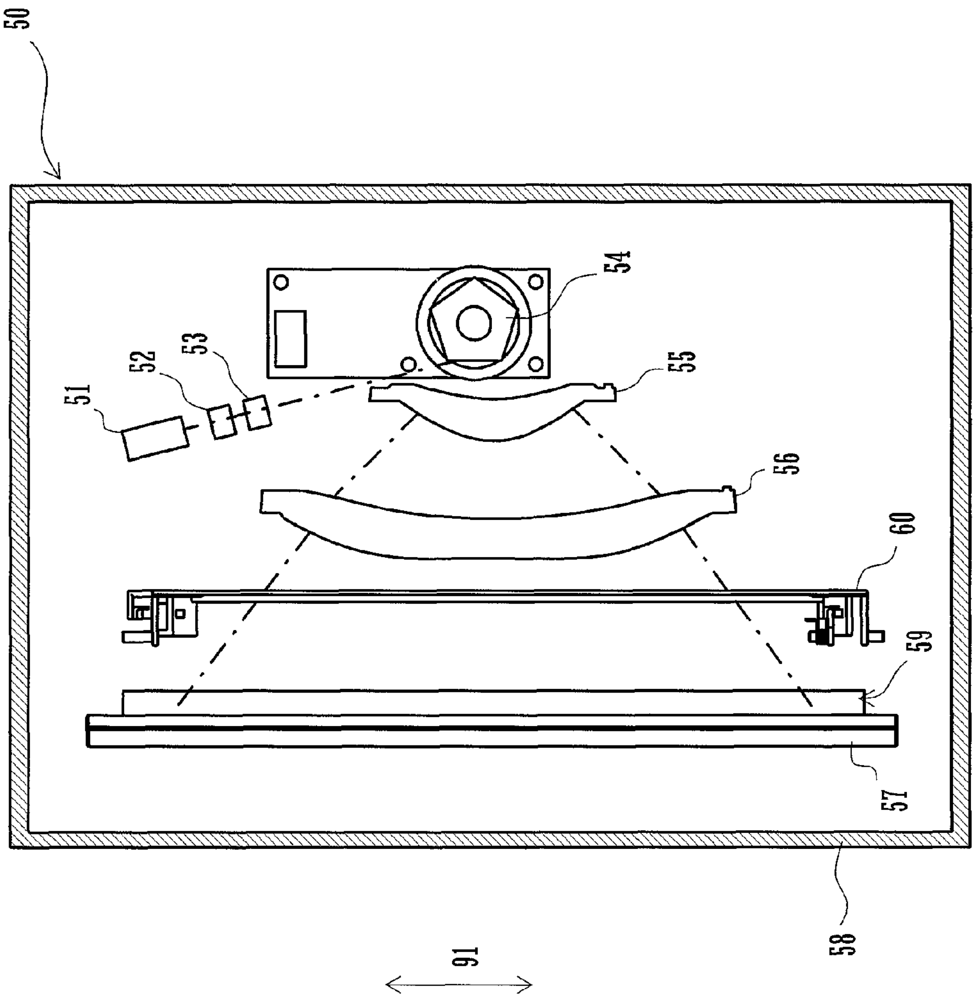
FIG. 2 is a sectional plan view schematically illustrating the structure of an optical scanning device.

The optical scanning device 50 is disposed in a bottom portion of the cover member 30. As shown in FIG. 2, the optical scanning device 50 includes a semiconductor laser (i.e., light source) 51, a collimator lens 52, a cylindrical lens 53, a polygon mirror 54, a first fθ lens 55, a second fθ lens 56, a reflecting mirror 57, a shutter member 60, and a housing 58 accommodating these components therein. The housing 58 has dustproof glass 59 below the reflecting mirror 57, the dustproof glass 59 being elongated in a primary scanning direction 91, which is a scanning direction of laser light.

The polygon mirror 54 is driven by a non-illustrated motor to rotate at a high velocity in a predetermined direction. The semiconductor laser 51 emits laser light according to the image data. The laser light emitted from the semiconductor laser 51 passes through the collimator lens 52 and cylindrical lens 53 and is then deflected at an equiangular velocity by the polygon mirror 54, which is deflecting means. Thereafter, the laser light becomes incident on the first fθ lens 55 and on the second fθ lens 56 and is then directed by the reflecting mirror 57 toward the main body 20 through the dustproof glass 59 to perform scanning at a constant velocity in the primary scanning direction 91.

The shutter member 60 is disposed on the optical path between the second fθ lens 56 and the reflecting mirror 57. The shutter member 60 will be specifically described later.

The main body 20 includes an electrophotographic processing section 70 and a sheet feeding section 80.

The electrophotographic processing section 70 includes the photoreceptor drum 71 as an electrostatic latent image bearing member, an electrostatic charger device 72, a developing unit 73, a transfer device 74, a cleaning unit 75, and a fixing device 76.

The electrostatic charger device 20 is configured to electrostatically charge a peripheral surface of the photoreceptor drum 71 to a predetermined potential. The laser light emitted from the semiconductor laser 51 passes through the dustproof glass 59 and is then applied onto the peripheral surface of the photoreceptor drum 71 to form thereon an electrostatic latent image according to the image data.

The developing unit 73 is removably mounted on the main body 20. The developing unit 73 is configured to develop the electrostatic latent image into a toner image by supplying toner (i.e., developer) to the peripheral surface of the photoreceptor drum 71. The transfer device 74 is configured to transfer the toner image onto a recording sheet fed from the sheet feeding section 80. The cleaning unit 75 is configured to recover residual toner that remains on the peripheral surface of the photoreceptor drum 71 after the transfer of the toner image onto the recording sheet. The fixing device 76 is configured to fix the toner image to the recording sheet securely by heating and pressurizing the recording sheet bearing the toner image thereon.

Figure 3:
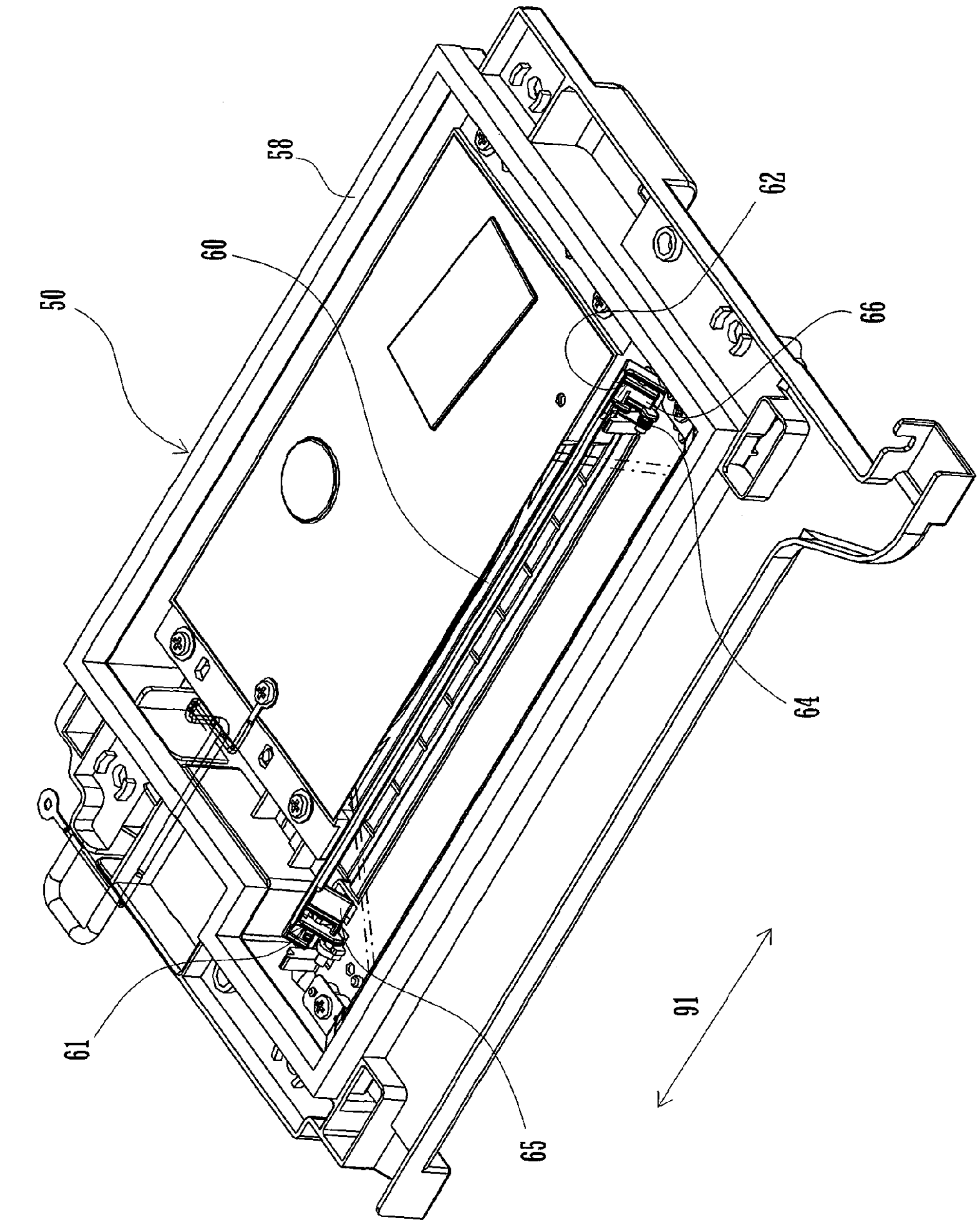
FIG. 3 is a perspective view, as viewed from the rear side, of the optical scanning device in a state in which a shutter member is in an optical path opening position while a housing is partially removed.
Figure 4:
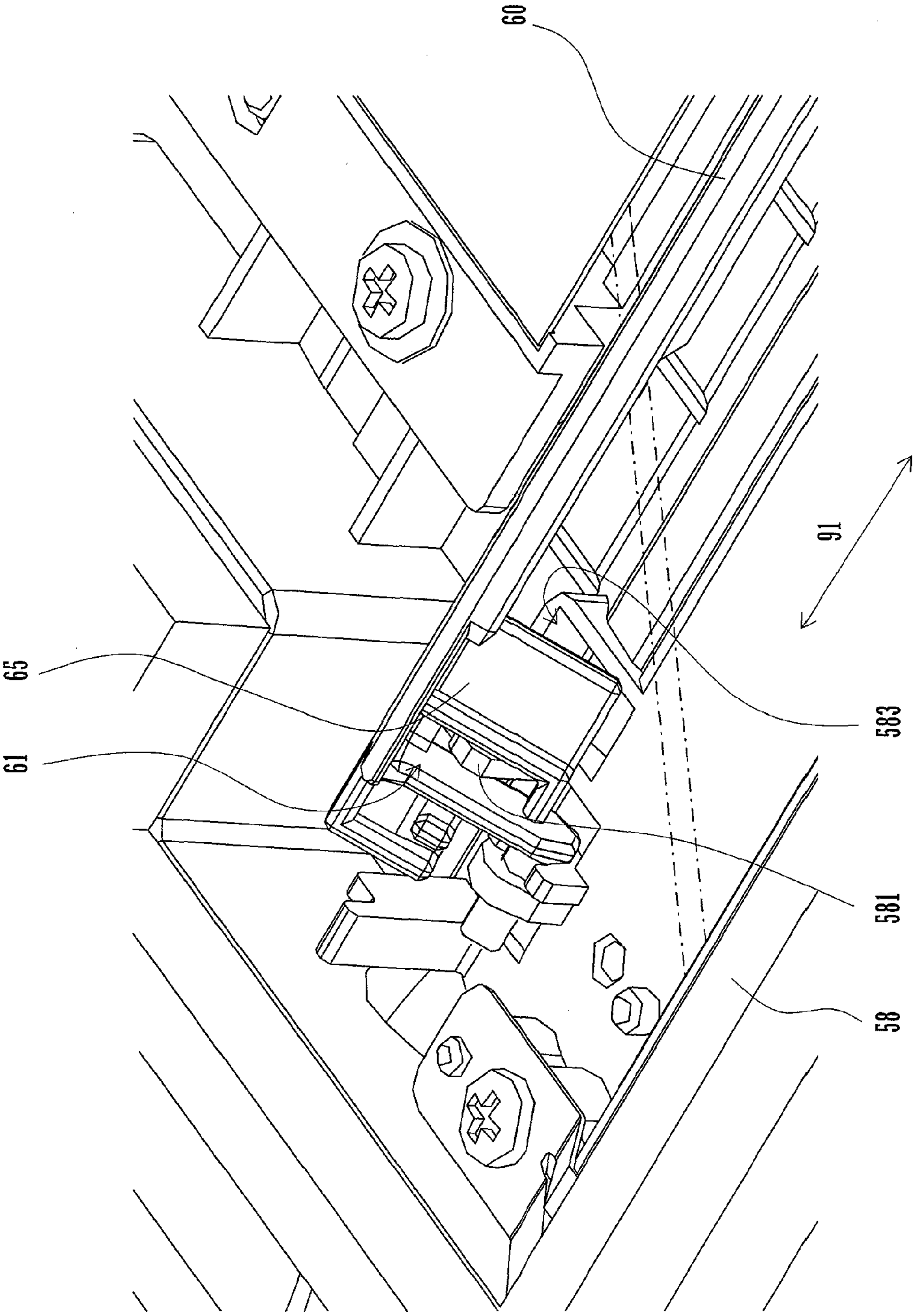
FIG. 4 is an enlarged view illustrating a first end portion of the shutter member shown in FIG. 3.
Figure 5:
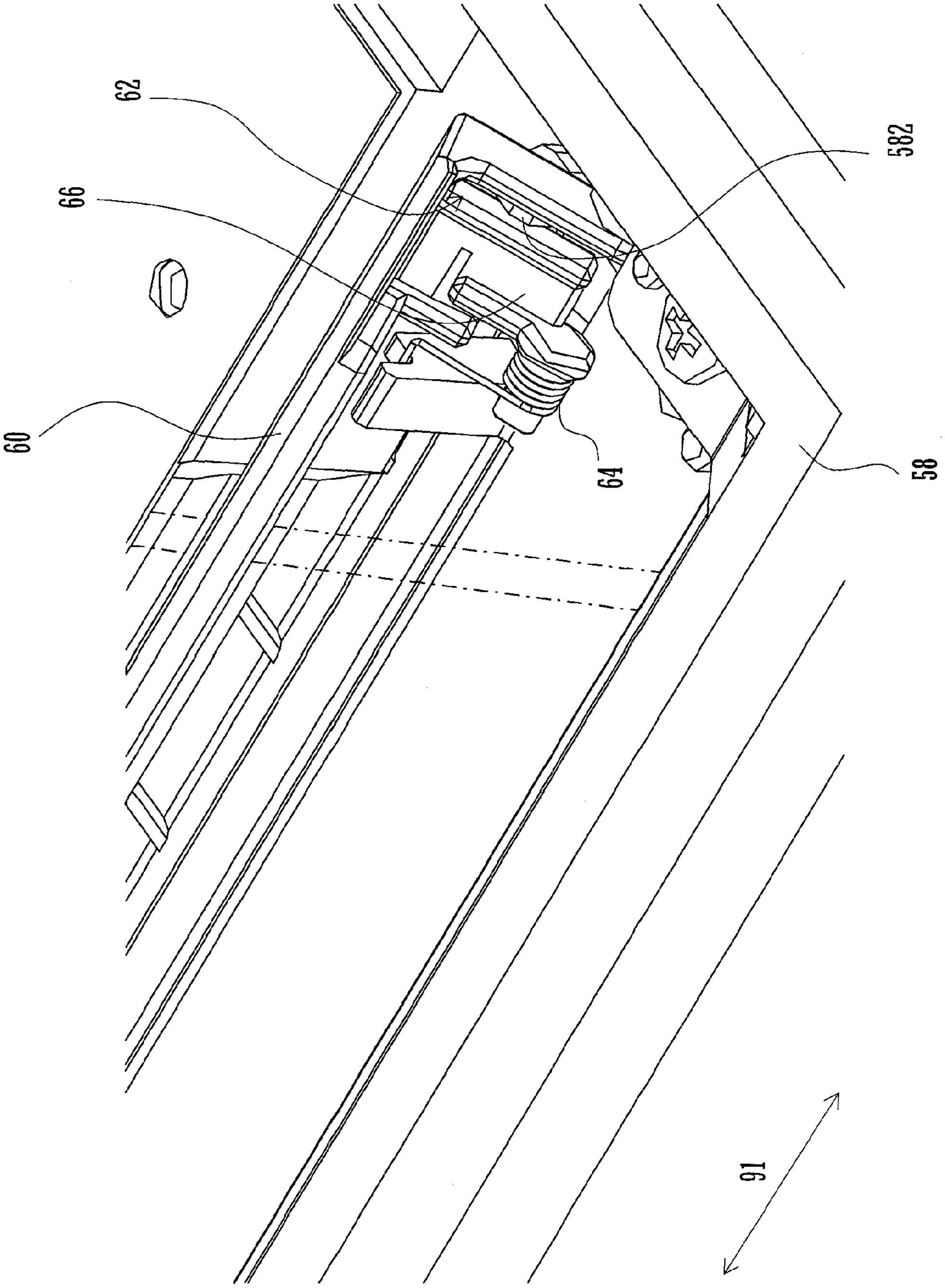
FIG. 5 is an enlarged view illustrating a second end portion of the shutter member shown in FIG. 3.
Figure 6:
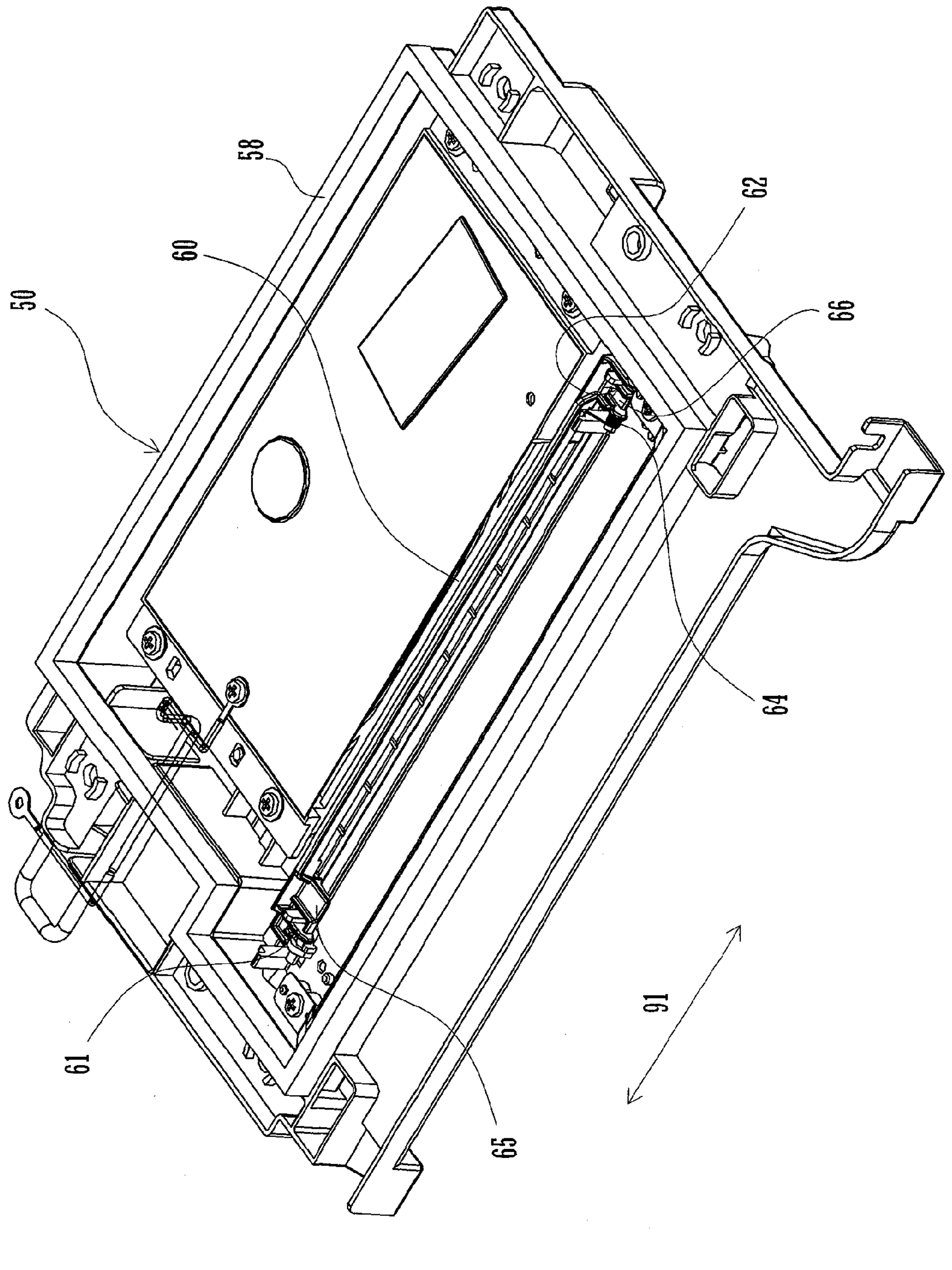
FIG. 6 is a perspective view, as viewed from the rear side, of the optical scanning device in a state in which the shutter member is in an optical path closing position while the housing is partially removed.
Figure 7:
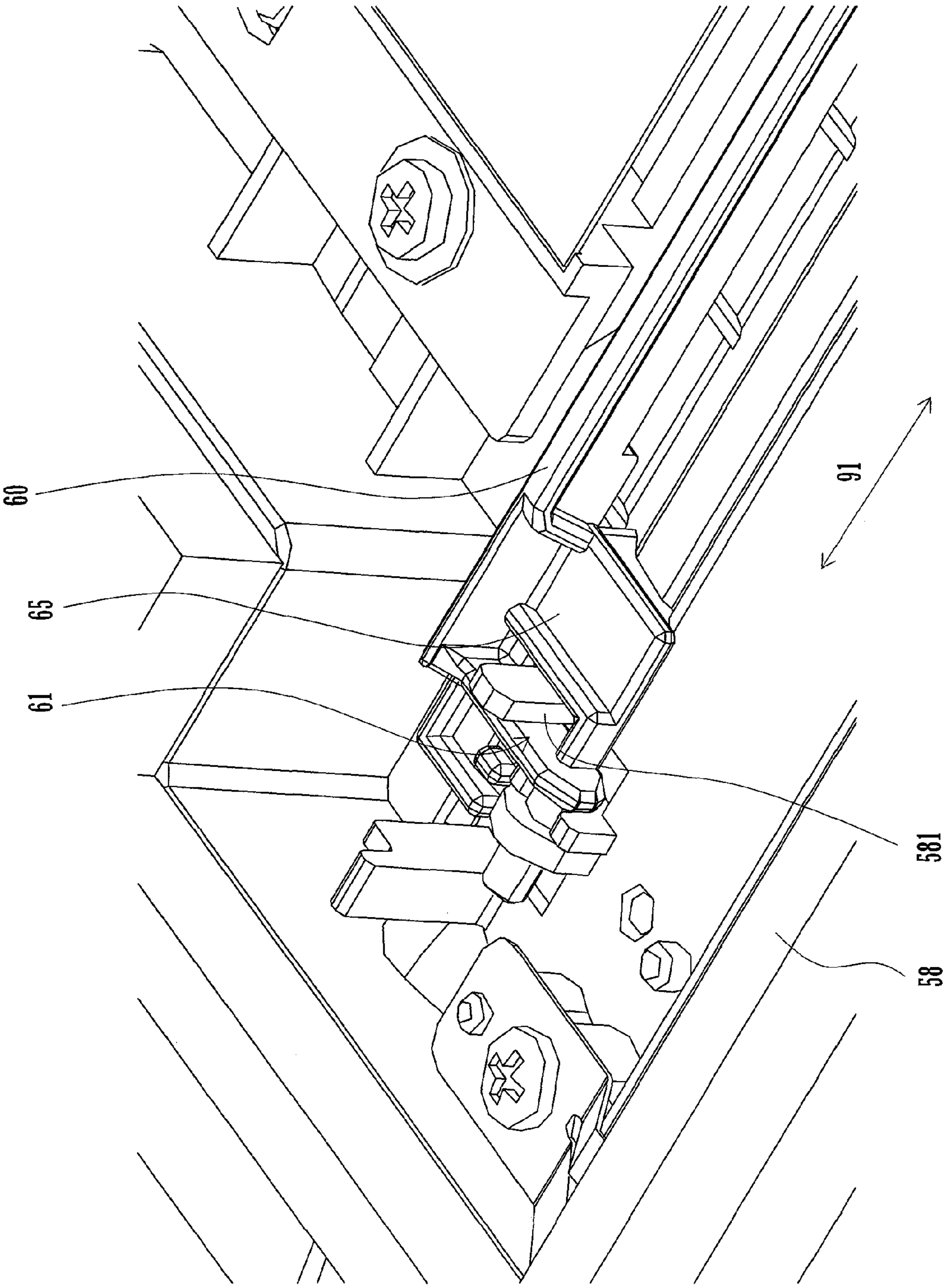
FIG. 7 is an enlarged view illustrating the first end portion of the shutter member shown in FIG. 6.
Figure 8:
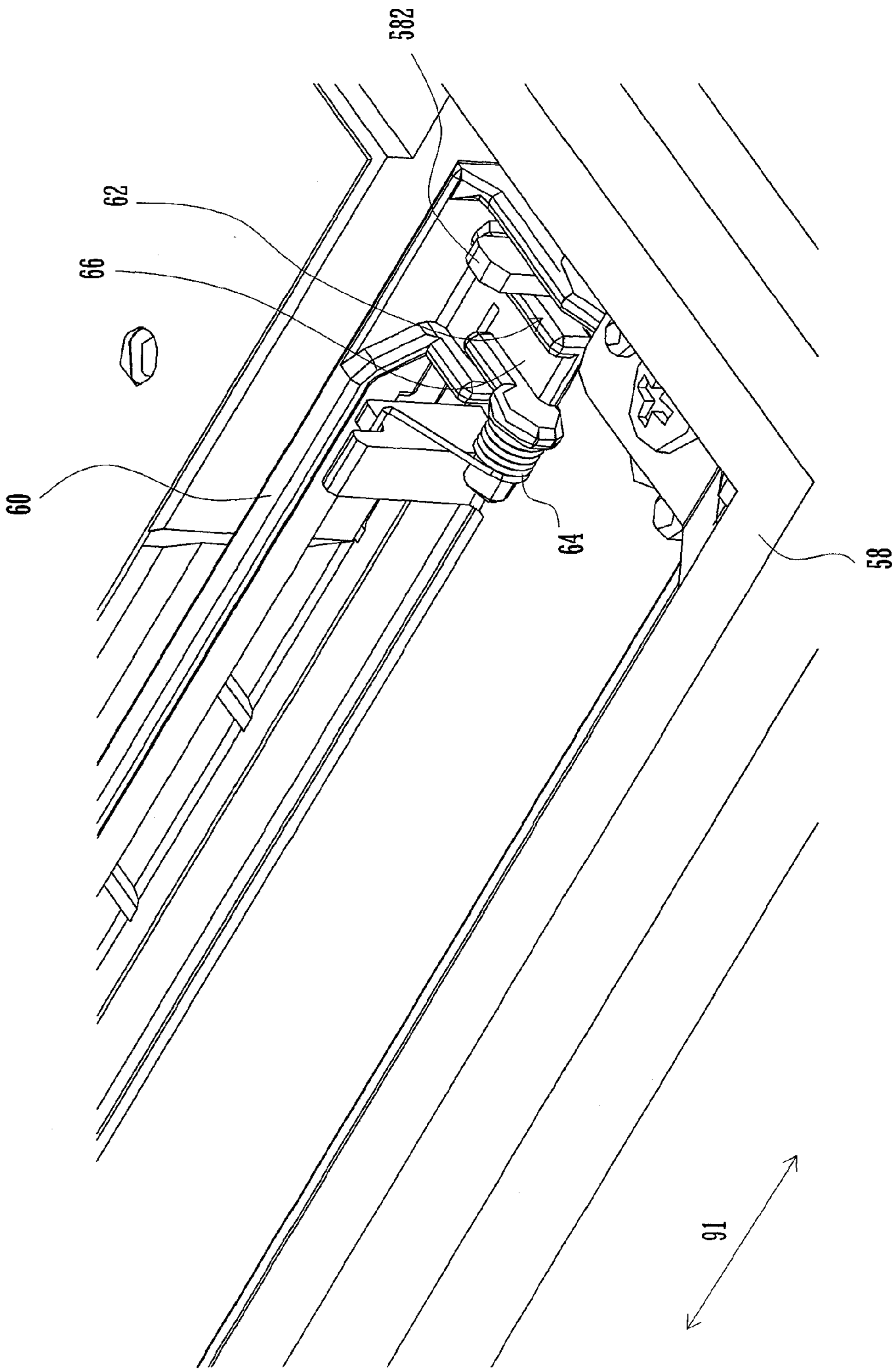
FIG. 8 is an enlarged view illustrating the second end portion of the shutter member shown in FIG. 6.

Referring to FIG. 3, the shutter member 60 is elongated in the primary scanning direction 91 and is pivotally supported on the housing 58 at its opposite end portions in the primary scanning direction 91. The shutter member 60 is displaceable between an optical path opening position for opening the optical path of the laser light as shown in FIGS. 3 to 5 and an optical path closing position for closing the optical path of the laser light as shown in FIGS. 6 to 8.

The shutter member 60 has through-holes 61 and 62 at its opposite end portions which are located outside a region extending in the primary scanning direction 91 through which the laser light passes (hereinafter will be referred to as "optical path region") at the position of the shutter member 60. The housing 58 is provided with guide portions 581 and 582 inserted in the respective through-holes 61 and 62. The guide portions 581 and 582 have a slightly smaller dimension in the primary scanning direction 91 than the through-holes 61 and 62. The guide portions 581 and 582 extend in the direction in which the shutter member 60 is displaceable and have such a length as can be inserted in the through-holes 61 and 62 whether the shutter member 60 is in the optical path opening position or in the optical path closing position. This feature can prevent the shutter member 60 from being displaced in the primary scanning direction 91.

The opposite end portions of the shutter member 60 in the primary scanning direction 91 are provided with coil springs 63 and 64 (of which the coil spring 63 is not shown) as exemplary biasing members. The coil springs 63 and 64 bias the shutter member 60 in the direction from the optical path opening position toward the optical path closing position.

Figure 9:
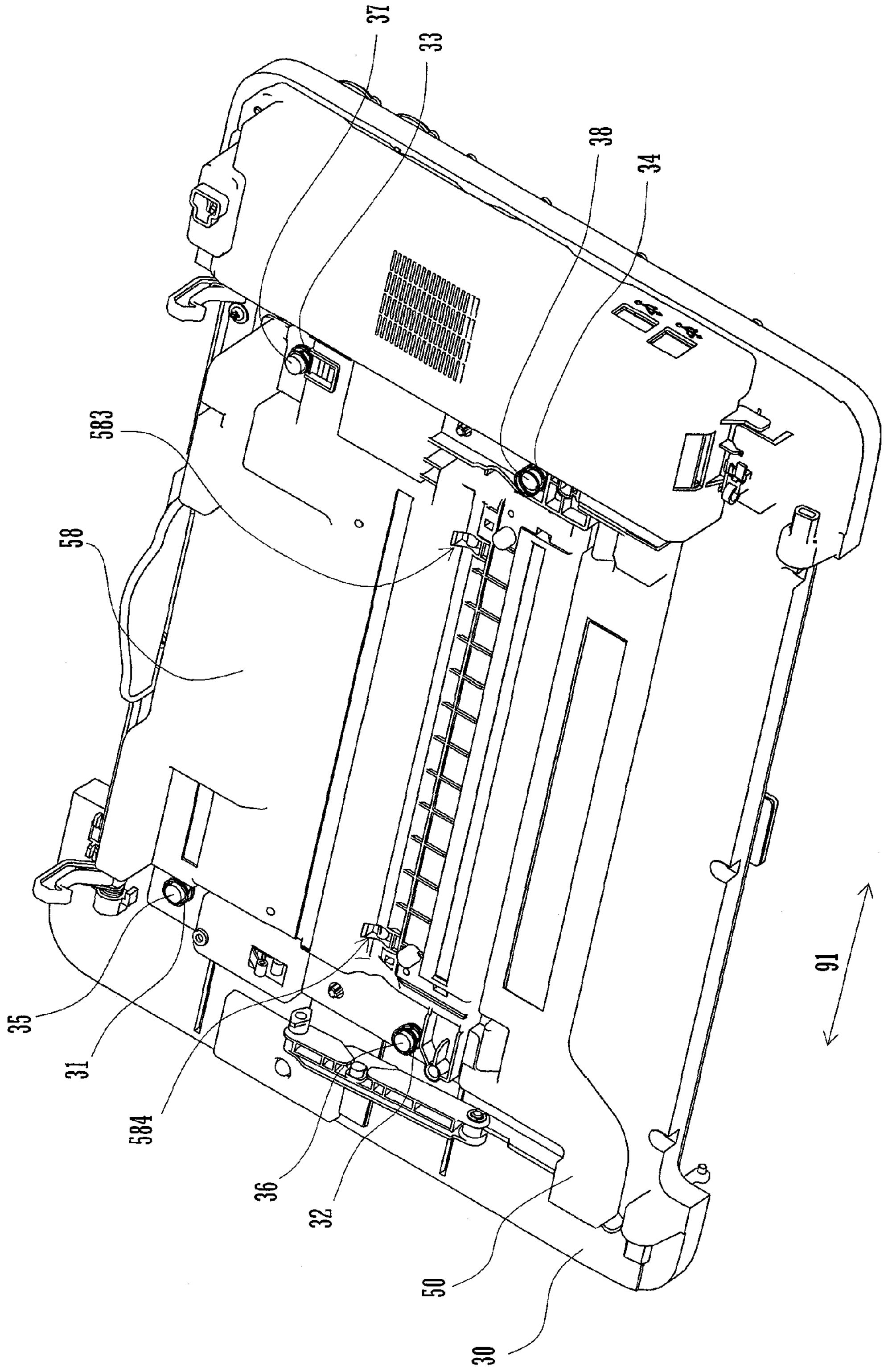
FIG. 9 is a perspective view, as viewed from the rear side, of a cover member in an inverted position.

As shown in FIG. 9, the housing 58 has openings 583 and 584 at its bottom surface facing the main body 20. The openings 583 and 584 are located at positions which lie outside the optical path region and are opposed to the opposite end portions of the shutter member 60 in the primary scanning direction 91.

The shutter member 60 has closing portions 65 and 66 at positions opposed to the respective openings 583 and 584. When the shutter member 60 is in the optical path closing position, the closing portions 65 and 66 close the openings 583 and 584, respectively, from inside the optical scanning device 50. The closing portions 65 and 66 are each shaped like a plate for example.

As shown in FIGS. 1A, 1B, 10A and 10B, the closing portions 65 and 66 have projections 67 and 68, respectively, which project toward the main body 20. (The projection 67 is not shown.)

The main body 20 is provided with contact members 21 and 22 projecting toward the cover member 30 (of which the contact member 21 is not shown). The contact members 21 and 22 are capable of coming into contact with the respective projections 67 and 68 of the shutter member 60 through the respective openings 583 and 584.

Figure 10B:
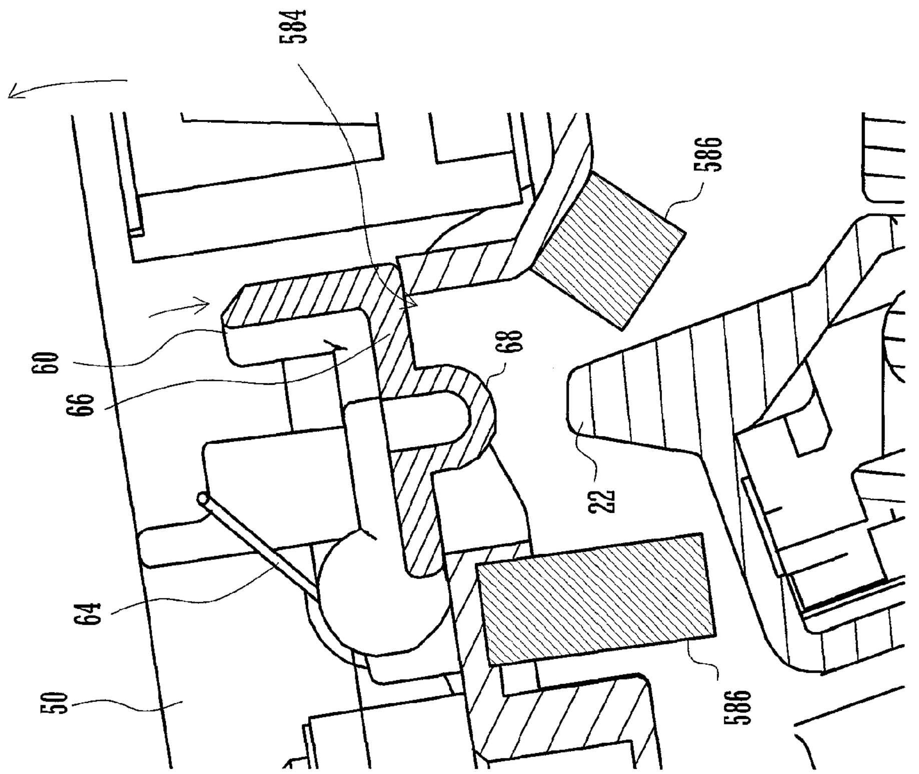
FIG. 10B is a partially enlarged sectional view of the image forming apparatus in transition from the closed condition to the open condition.
Figure 10A:
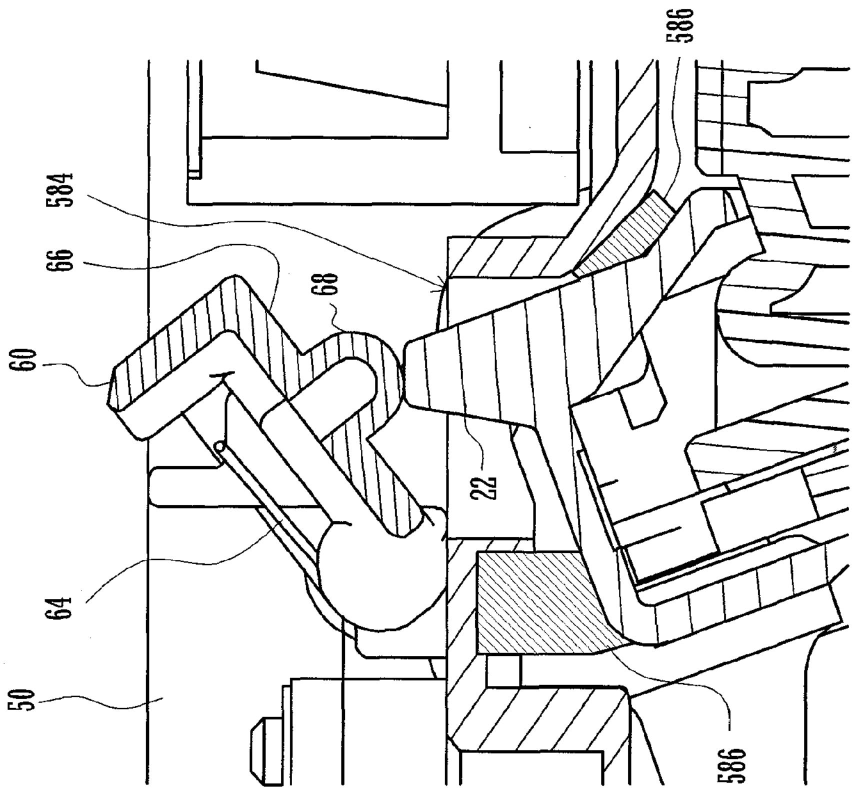
FIG. 10A is a partially enlarged sectional view of the image forming apparatus in the closed condition.

When the cover member 30 assumes the closed position shown in FIG. 1A, the contact members 21 and 22 come into contact with the respective projections 67 and 68 through the respective openings 583 and 584 to press up the shutter member 60 into the optical path opening position, as shown in FIG. 10A. This allows the laser light to be applied to the photoreceptor drum 71 without blockage by the shutter member 60 during normal operation, namely, when the cover member 30 is in the closed position.

Dustproof members 585 and 586 having elasticity are disposed on the outer side of the housing 58 so as to extend around the respective openings 583 and 584. (The dustproof member 585 is not shown.) Each of the dustproof members 585 and 586 is shaped annular and extends around the entire periphery of the associated one of the openings 583 and 584. Each of the dustproof members 585 and 586 is designed to press against the entire periphery of the associated one of the contact members 21 and 22 when the cover member 30 is in the closed position. The dustproof members 585 and 586 are formed from urethane sponge for example. Since each of the dustproof members 585 and 586 presses against the entire periphery of the associated one of the contact members 21 and 22 when the cover member 30 is in the closed position, the openings 583 and 584 are closed from outside the housing 58.

When the cover member 30 starts being displaced from the closed position shown in FIG. 1A toward the open position shown in FIG. 1B, the optical scanning device 50 becomes positioned away from the contact members 21 and 22 as shown in FIG. 10B, so that the shutter member 60 is caused to pivot down into the optical path closing position by the elastic force of the coil springs 63 and 64. Thus, the closing portions 65 and 66 of the shutter member 60 are pressed against the openings 583 and 584 from inside the housing 58. After the closing portions 65 and 66 have come into contact with the respective openings 583 and 584, the dustproof members 585 and 586 are separated from the peripheries of the respective contact members 21 and 22.

During maintenance, namely, when the cover member 30 is in the open position, the shutter member 60 assumes the optical path closing position. For this reason, laser light, even when emitted from the semiconductor laser 51 by malfunction or the like, is blocked within the housing 51 and hence can be prevented from leaking out of the housing 58.

When the cover member 30 is in the open position, the closing portions 65 and 66 of the shutter member 60 are pressed against the openings 583 and 584 from inside the housing 58 and, hence, the openings 583 and 584 are closed from inside the housing 58.

The image forming apparatus 10 thus constructed is capable of preventing laser light from leaking out of the housing 58 during maintenance while applying laser light onto the photoreceptor drum 71 during normal operation. Further, since the openings 583 and 584 are closed during both of the normal operation and the maintenance, the image forming apparatus 10 is capable of preventing the entry of dust into the housing 58 of the optical scanning device 50 provided with the shutter member 60 which is displaceable between the optical path closing position and the optical path opening position. Therefore, the image forming apparatus 10 can avoid degradation in image quality due dust entering the inside of the housing 58 of the optical scanning device 50 and floating over the optical path of laser light.

Preferably, the length of the contact members 21 and 22 and the thickness of the dustproof members 585 and 586 are established such that when the cover member 30 moves from the open position to the closed position, the closing portions 65 and 66 open the respective openings 583 and 584 after the dustproof members 585 and 586 have come into contact with the peripheries of the respective contact members 21 and 22, whereas when the cover member 30 moves from the closed position to the open position, the dustproof members 585 and 586 are separated from the peripheries of the respective contact members 21 and 22 after the closing portions 65 and 66 have closed the openings 583 and 584. This feature allows the openings 583 and 584 to be constantly closed from outside or inside the housing 58.

Alternatively, the length of the contact members 21 and 22 and the thickness of the dustproof members 585 and 586 may be established such that when the cover member 30 moves from the open position to the closed position, the shutter member 60 is displaced from the optical path closing position to the optical path opening position after the dustproof members 585 and 586 have come into contact with the peripheries of the respective contact members 21 and 22, whereas when the cover member 30 moves from the closed position to the open position, the dustproof members 585 and 586 are separated from the peripheries of the respective contact members 21 and 22 after the shutter member 60 has been displaced from the optical path opening position to the optical path closing position.

Though the closing portions 65 and 66 need not necessarily be provided with the projections 67 and 68, the provision of the projections 67 and 68 on the closing portions 65 and 66 makes it possible to shorten the projecting length of the contact members 21 and 22 by a length equal to the length of the projections 67 and 68, thereby to suppress degradation in user's handleability due to the contact members 21 and 22 projecting long.

The contact members 21 and 22 are preferably located on the developing unit 73, as shown in FIGS. 1A and 1B. The developing unit 73 is removably mounted on the main body 20 as described above. Therefore, with the developing unit 73 being removed from the main body 20, the shutter member 60 is always in the optical path closing position without displacement to the optical path opening position. Thus, laser light, even when emitted from the semiconductor laser 51 by malfunction or the like, is blocked within the housing 58 of the optical scanning device 50 and hence can be prevented from leaking out of the housing 58 of the optical scanning device 50 when the image forming apparatus 10 is not ready to carry out the image forming process.

Since the guide portions 581 and 582 have such a length as can be inserted in the through-holes 61 and 62 whether the shutter member 60 is in the optical path opening position or in the optical path closing position, the shutter member 60 can be prevented from being displaced in the primary scanning direction 91. Accordingly, it is possible to prevent communication between the inside and the outside of the housing 58 that occurs due to displacement of the closing portions 65 and 66 relative to the openings 583 and 584. This feature can also prevent dust from entering the inside of the housing 58 of the optical scanning device 50.

Since the shutter member 60 is pivotally supported on the housing 58 of the optical scanning device 50 as described above, the shutter member 60 pivots between the optical path closing position and the optical path opening position. For this reason, the optical scanning device 50 can be made smaller in size than an optical scanning device having a shutter member designed to move linearly.

Figure 11:
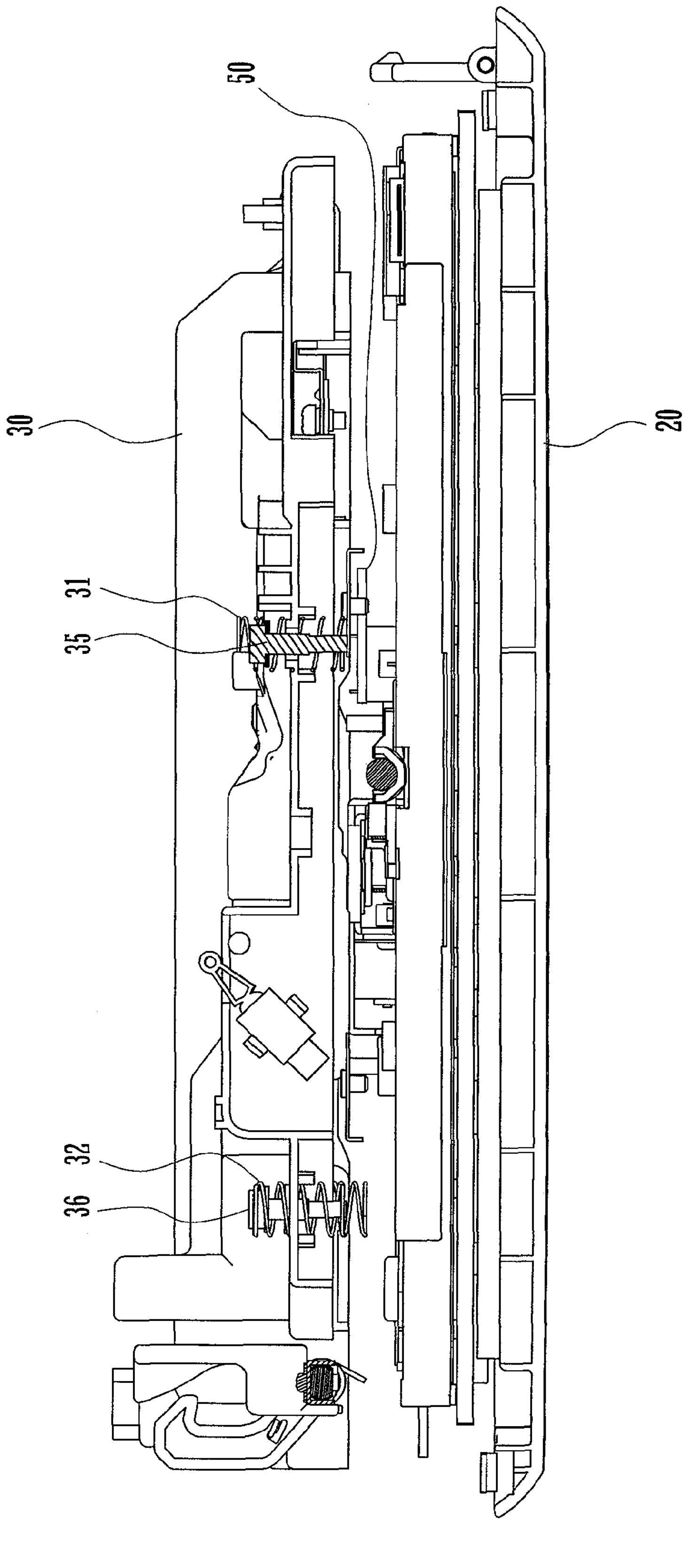
FIG. 11 is a sectional side elevational view of the image forming apparatus in a state in which some parts are removed.

Preferably, the optical scanning device 50 is supported on the cover member 30 so as to be shakable within a predetermined range while being biased in a direction away from the cover member 30 by springs 31 to 34 (see FIG. 9) forming an exemplary elastic member, as shown in FIG. 11. In the present embodiment, the optical scanning device 50 is supported on the cover member 30 by means of stepped screws 35 to 38 so as to be movable toward and away from the cover member 30 within a predetermined range while being biased in a direction away from the cover member 30 by springs 31 to 34 fitted over the respective stepped screws 31 to 34.

With the arrangement in which the optical scanning device 50 is supported on the cover member 30 so as to be shakable within the predetermined range while being biased in the direction away from the cover member 30, the optical scanning device 50 is pressed against the main body 20 when the cover member 30 is in the closed position. Thus, the distance between the optical scanning device 50 and the photoreceptor drum 71 is made constant when the cover member 30 is in the closed position. Therefore, the positional precision of scanning by the optical scanning device 50 relative to the peripheral surface of the photoreceptor drum 71 can be enhanced.

Further, with the arrangement in which the optical scanning device 50 is supported on the cover member 30 so as to be shakable within the predetermined range while being biased in the direction away from the cover member 30, the dustproof members 585 and 586 and the main body 20 are pressed against each other at an increased pressure when the cover member 30 is in the closed position, so that the openings 583 and 584 are closed with improved tightness.

Even when the image forming apparatus 10 is placed with its main body 20 positioned above the cover member 30, the openings 583 and 584 can be closed reliably during both of the normal operation and the maintenance and, hence, the image forming apparatus 10 can exercise the effect of preventing dust from entering the inside of the housing 58 of the optical scanning device 50.

Even when only one pair of the through-hole 61 or 62 and the guide portion 581 or 582 is provided at one of the opposite end portions in the primary scanning direction 91, the image forming apparatus 10 can exercise the effect of preventing the shutter member 60 from being displaced in the primary scanning direction 91.

Further, the image forming apparatus 10 may have a feature such that the shutter member 60 is provided with a biasing member at its one end portion only in the primary scanning direction 91 so as to be biased in the direction from the optical path opening position toward the optical path closing position.

The image forming apparatus 10 may be provided with only one pair of the opening 583 or 584 and the closing portion 65 or 66 which is located at one end portion of the shutter member 60 in the primary scanning direction 91.

In the present invention, the provision of the scanner unit 40 is not an essential requirement.

The foregoing embodiments are illustrative in all points and should not be construed to limit the present invention. The scope of the present invention is defined not by the foregoing embodiments but by the following claims. Further, the scope of the present invention is intended to include all modifications within the scopes of the claims and within the meanings and scopes of equivalents.

What is claimed is:

1. An image forming apparatus comprising:

a main body; and a cover member holding an optical scanning device and supported on the main body in such a manner as to be pivotable between a predetermined open position and a predetermined closed position, wherein:

the optical scanning device has a light source for emitting laser light, a shutter member which is displaceable between an optical path closing position for closing an optical path of the laser light and an optical path opening position for opening the optical path, a housing accommodating the light source and the shutter member therein and having an opening at a bottom surface facing the main body, and a dustproof member having elasticity;

the main body has a contact member which is capable of coming into contact with the shutter member through the opening and which becomes positioned away from the shutter member to cause the shutter member to assume the optical path closing position when the cover member assumes the open position while coming into contact with the shutter member to cause the shutter member to assume the optical path opening position when the cover member assumes the closed position;

the shutter member includes a closing portion which closes the opening from inside the housing when the shutter member assumes the optical path closing position; and the dustproof member is disposed on an outer side of the housing in such a manner as to extend around the opening and is configured to press against an entire periphery of the contact member when the cover member assumes the closed position.

2. The image forming apparatus according to claim 1, wherein the length of the contact member and the thickness of the dustproof member are established such that when the cover member moves from the open position to the closed position, the closing portion opens the opening after the dustproof member has come into contact with the periphery of the contact member, whereas when the cover member moves from the closed position to the open position, the dustproof member is separated from the periphery of the contact member after the closing portion has closed the opening.

3. The image forming apparatus according to claim 1, wherein the length of the contact member and the thickness of the dustproof member are established such that when the cover member moves from the open position to the closed position, the shutter member is displaced from the optical path closing position to the optical path opening position after the dustproof member has come into contact with the periphery of the contact member, whereas when the cover member moves from the closed position to the open position, the dustproof member is separated from the periphery of the contact member after the shutter member has been displaced from the optical path opening position to the optical path closing position.

4. The image forming apparatus according to claim 1, wherein the shutter member has a projection for contact with the contact member.

5. The image forming apparatus according to claim 1, wherein:

the main body has a removable developing unit configured to develop an electrostatic latent image formed by the optical scanning unit; and the contact member is provided on the developing unit.

6. The image forming apparatus according to claim 1, wherein the shutter member is pivotally supported on the housing.

7. The image forming apparatus according to claim 1, wherein:

the shutter member has a through-hole; and the housing has a guide portion inserted in the through-hole to inhibit the shutter member from moving in a scanning direction of the laser light.

8. The image forming apparatus according to claim 1, wherein the optical scanning device is supported on the cover member in such a manner as to be shakable within a predetermined range while being biased by an elastic member in a direction away from the cover member.

* * * * *